(12) United States Patent  
Barber

(10) Patent No.: US 6,698,523 B2
(45) Date of Patent: Mar. 2, 2004

(54) ELECTROHYDRAULIC CONTROL SYSTEM FOR IMPLEMENT LIFT CYLINDERS

(75) Inventor: Dennis R. Barber, Oconomowoc, WI (US)

(73) Assignee: HUSCO International, Inc., Waukesha, WI (US)

(*) Notice: Subject to any disclaimer, the term of this patent is extended or adjusted under 35 U.S.C. 154(b) by 0 days.

(21) Appl. No.: 10/189,110

(22) Filed: Jul. 2, 2002

(65) Prior Publication Data

US 2004/0016556 A1 Jan. 29, 2004

(51) Int. Cl.$^7$ ............................................. A01B 63/111
(52) U.S. Cl. ............................. 172/4; 172/239; 172/452
(58) Field of Search ........................... 172/2, 4, 4.5, 7, 172/8, 10, 11, 12, 310, 311, 452, 453, 465, 491, 239; 91/518, 520, 522, 523, 524, 526, 527, 528, 530, 536

(56) References Cited

U.S. PATENT DOCUMENTS

| | | | |
|---|---|---|---|
| 3,663,032 A | | 5/1972 | Hook, et al. |
| 4,630,526 A | * | 12/1986 | Burk et al. ................... 91/452 |
| 4,646,620 A | * | 3/1987 | Buchl .............................. 91/1 |
| 4,700,784 A | * | 10/1987 | Wiebe et al. ............... 172/126 |
| 4,821,806 A | * | 4/1989 | Winter .......................... 172/4 |
| 5,449,042 A | * | 9/1995 | Landphair et al. .......... 172/456 |
| 5,957,218 A | | 9/1999 | Noonan et al. |
| 6,129,157 A | * | 10/2000 | Noonan et al. .............. 172/239 |
| 6,164,385 A | * | 12/2000 | Buchl .......................... 172/239 |
| 6,220,366 B1 | * | 4/2001 | Noonan et al. ............. 172/311 |
| 6,382,326 B1 | | 5/2002 | Goins et al. |

* cited by examiner

Primary Examiner—Robert E. Pezzuto
Assistant Examiner—Nathan Mammen
(74) Attorney, Agent, or Firm—George E. Haas; Quarles & Brady LLP

(57) ABSTRACT

Different sections of an agricultural implement can be raised and lowered independently and by varying amounts by a unique hydraulic system. That system incorporates a three-position, four-way primary control valve which selectively connects a supply line and a tank return line to first and second hydraulic lines. A plurality of double acting hydraulic cylinders are provided to produce movement of lift assemblies with respect to a frame of the implement. A separate electrohydraulic lift control valve for each hydraulic cylinder couples one cylinder chamber to the first hydraulic line and the other cylinder chamber is connected directly to the second hydraulic line. Operation of the primary control valve determines the movement direction and selective activation of the lift control valves determines whether the associated section of the implement moves and the amount of such movement.

9 Claims, 3 Drawing Sheets

ELECTROHYDRAULIC CONTROL SYSTEM FOR IMPLEMENT LIFT CYLINDERS

CROSS-REFERENCE TO RELATED APPLICATIONS

Not Applicable.

STATEMENT REGARDING FEDERALLY SPONSORED RESEARCH OF DEVELOPMENT

Not Applicable.

BACKGROUND OF THE INVENTION

1. Field of the Invention

The present invention relates generally to agricultural implements, and, more specifically, to hydraulic systems for lifting and controlling the depth of such implements.

2. Related Art

Typical multi-frame agricultural implements, such as field cultivators and chisel plows, use a hydraulic system to vary the depth that the implement enters the earth during fieldworking operations and to provide adequate ground clearance during transport. Some hydraulic systems, such as shown in U.S. Pat. No. 3,663,032, employ rephasing cylinders connected in series to raise and lower the frames in unison. A flow control valve on the towing vehicle extends or retracts the series connected cylinders in unison. The cylinder capacities and strokes usually must be carefully matched for proper cylinder operation. Also, leakage across the seals of one or more cylinders causes the cylinders to get out of phase, which results in uneven operation across the width of the implement. To rephase the cylinders, the machine normally must be fully raised, which results in loss of time and operating efficiency.

Other systems rely on mechanical depth stops to control operating height, but do not allow the operator to change that height from the cab or to easily vary depth for different transport conditions, ground contours and soil conditions. In addition, both the series cylinder and the mechanical depth stop systems require mechanical adjustment outside the cab to adjust the height of wing frames relative to the main or center frame. Adequate level control for fore-and-aft frame leveling or tilt and for leveling from side to side have presented problems.

On implements with a main frame and individual wing frames, depth of penetration of the wing sections often varies from that of the main frame, but the rephasing cylinder arrangement fails to accommodate easy and reliable adjustments of the wing sections relative to the main frame. The stroke and size of the wing frame cylinder sometimes is determined by the cylinder matching requirements of the hydraulic system, rather than by lift capacity and space considerations, so that the cylinders are not optimal or most economical.

As a consequence, a system that enables the control of the individual cylinders at each wheel of the implement was developed and is described in U.S. Pat. No. 5,957,218. That system has a master selection control valve which is controlled by the operator when it is desired to raise or lower the implement. The master selection control valve meters the flow of hydraulic fluid into supply lines that extended to a plurality of three-position, four-way control valves. Each of those four-way control valves is associated with one of the cylinders and is operated independently by a solenoid in response to a signal from an implement control unit.

To raise the implement, a signal from the implement control unit causes the solenoid to move the respective control valve from the center blocking position into a position at which the base end of the associated cylinder is connected to the supply line of pressurized fluid and the rod end of the cylinder is connected to a tank return line. When it is desired to lower the implement, a signal causes the solenoid to move the valve to the opposite position to apply pressurized fluid to the rod end of the cylinder and drain fluid from the base end. By individually controlling the control valve for each cylinder, a given wheel can be independently raised or lowered, thus enabling one side of the implement to be positioned higher than the other side, This hydraulic system is relatively expensive and complex as requiring a separate three-position, four-way control valve for each wheel of the implement.

SUMMARY OF THE INVENTION

The present invention provides a hydraulic system to control the lift and depth across the entire width of an implement.

An agricultural implement has a frame supported by a plurality of movable lift assemblies that are capable of raising and lowering the frame relative to the ground. A lift system is provided move the lift assemblies using pressurized hydraulic fluid from a supply line. Following use, the hydraulic fluid is recycled through a tank return line.

The lift system has first and second hydraulic lines which are selectively coupled to the supply and tank return lines by a primary control valve. In a preferred embodiment of the system, the primary control valve comprises a three-position, four-way valve which is controlled by the implement operator. A separate hydraulic cylinder is associated with each lift assembly to produce the mechanical force that raises and lowers the frame in a controlled manner. A lift valve circuit, comprising a plurality of two-position lift control valves, couples the plurality of hydraulic cylinders to the first hydraulic line and the second hydraulic line.

In one version of the present invention, each hydraulic cylinder has a first port connected to the second hydraulic line and has a second port. A plurality of lift control valves couples the second port of the hydraulic cylinders to the first hydraulic line to control flow of hydraulic fluid there between. Each lift control valve is controlled individually so that its associated lift assembly may be independently operated.

Operation of the primary control valve determines whether the implement is to be raised or lowered. Activation of specific ones of the plurality of lift control valves determines which sections of the frame are to move and the amount that a given section moves with respect to the other sections.

In the preferred embodiment, transducers are provided to produce electrical signals indicating the actual position of each lift assembly. A control unit compares the actual position to a desired position for each lift assembly and closes a particular lift control valve when the associated lift assembly reaches the desired position. The remaining lift assemblies continue to move until they reach their individual desired positions.

DETAILED DESCRIPTION OF THE INVENTION

Figure 1:
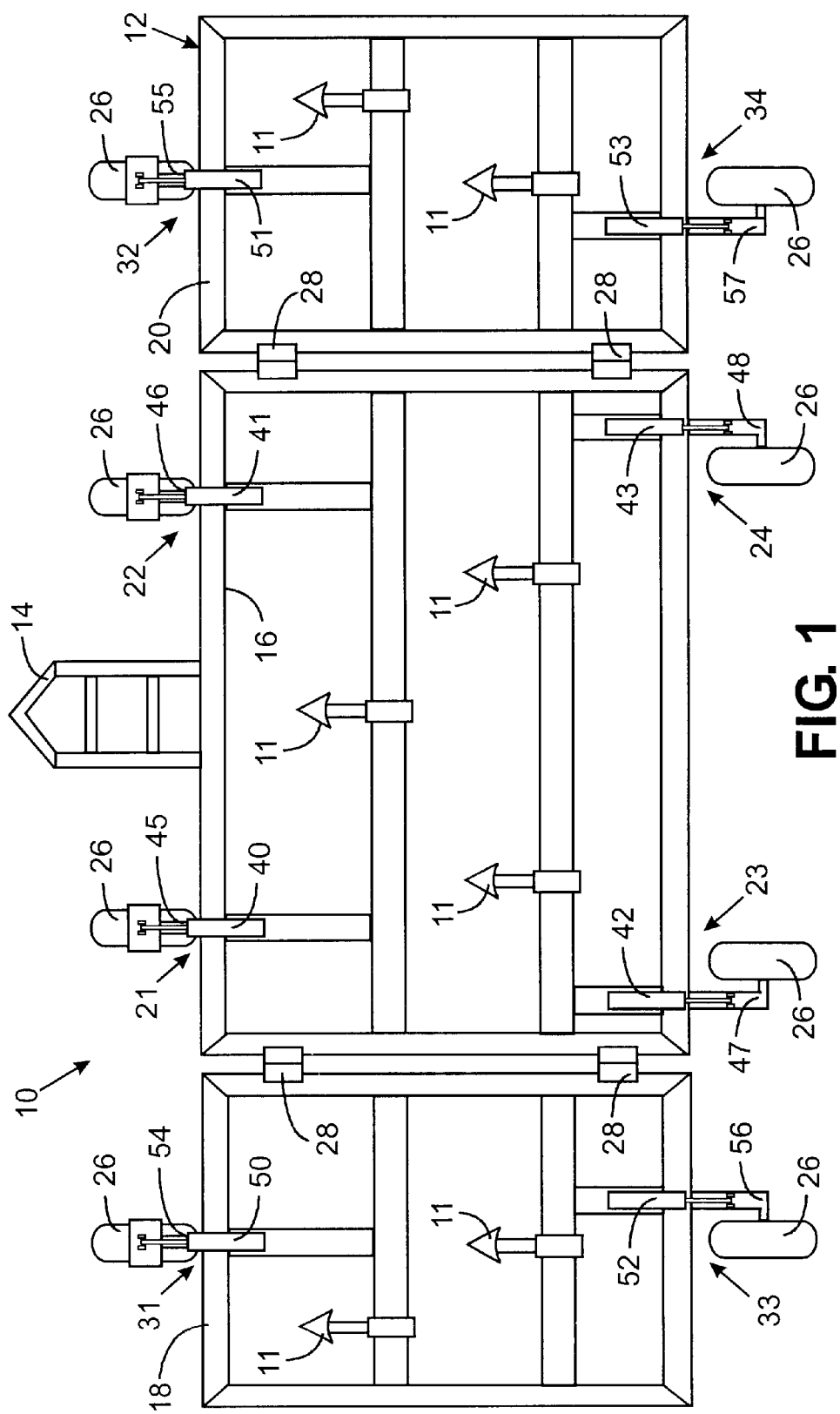
FIG. 1 is a top view of a portion of a tillage implement frame with a hydraulic system according to the present invention.

With initial reference to FIG. 1, an agricultural implement 10 has earth working tools 11 supported from a transversely extending frame assembly 12 which includes a center frame 16 and opposite wing frames 18 and 20. The two wing frames 18 and 20 are connected to the center frame 16 by hinges 28 for pivoting relative to the center frame about fore-to-aft extending axes. A hitch structure 14 is pivotally supported from the front of the center frame 16 for connection to a tractor (not shown) for towing the implement 10.

The frame assembly 12 is supported by a plurality of wheels 26 that are mounted on separate lift assemblies. Two forward lift assemblies 21 and 22 are connected to a front portion of the center frame 16, and two rearward lift assemblies 23 and 24 are attached to an aft portion of the center frame. These lift assemblies 21, 22, 23 and 24 include double acting cylinders 40, 41, 42 and 43, respectively, which are connected to wheel support arms 45, 46, 47 and 48 pivotally attached to the center frame 16. The wing frames 18 and 20 include fore wing lift assemblies 31 and 32 and aft wing lift assemblies 33 and 34, respectively. The wing lift assemblies 31, 32, 33 and 34 include double acting cylinders 50, 51, 52 and 53, respectively, which are connected to wheel support arms 54, 55, 56 and 57 pivotally connected to the associated wing frame 18 or 20. When the cylinders are extended, the corresponding portions of the frames are lifted relative to the ground. By retracting the cylinders, the corresponding portions are lowered with respect to the ground.

The lift assemblies 21–24 and 31–34 move the frame assembly 12 between a raised transport position, in which the tools 11 are a substantial distance above the ground, and a lowered field-working position, wherein the tools 11 penetrate the ground. In the field-working position, the lift assembly cylinders 40–43 and 50–53 can be extended or retracted to adjust the depth of penetration of the tools 11 from a shallow skimming position to a lowermost deep tillage position. The lift assembly cylinders can be adjusted to vary the positions of the wing frames 18 and 20 relative to the center frame 16, and to level or vary frame height from side-to-side and front-to-rear.

Figure 2:
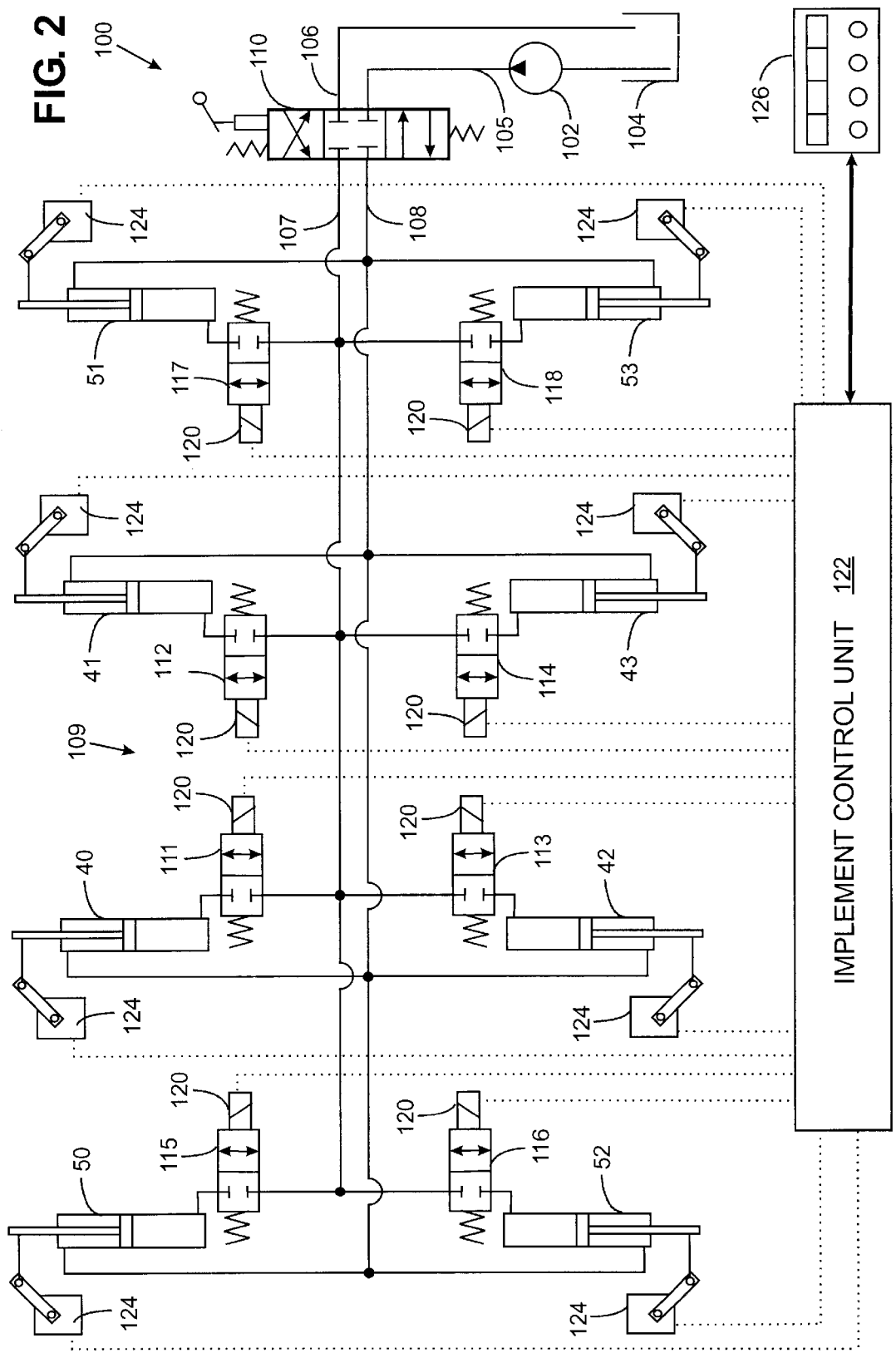
FIG. 2 is a schematic diagram of the hydraulic system.

The lift assembly cylinders 40–43 and 50–53 are part of a hydraulic system 100, illustrated in FIG. 2. The hydraulic system 100 includes a pump 102 which draws hydraulic fluid from a tank 104 and supplies that fluid under pressure to a supply line 105. A return line 106 is provided to convey the fluid back into the tank 104. The supply line 105 and tank return line 106 are connected to a three-position, four-way primary control valve 110, which selectively couples those lines to first and second hydraulic lines 107 and 108. Typically the pump 102, tank 104, supply and return lines 105 and 106, and the primary control valve 110 are located on the tractor which pulls the implement 10. However, the primary control valve 110 may be located on the implement 10 and activated by solenoids driven by electrical signals from the tractor.

The first and second hydraulic lines 107 and 108 extend across the frame 16 of the implement and connected to a lift valve circuit 109. Specifically, the second hydraulic line 108 is connected directly to a port for the rod chamber of each lift assembly cylinder 41–43 and 51–53. As used herein, the term "connected directly" means that a valve is not located between respective lift assembly cylinder and the second hydraulic line 108. Eight electrohydraulic control valves 111–118 couple another port for the base chamber of each lift assembly cylinder 41–43 and 51–53 to the first hydraulic line 107. Each electrohydraulic control valve 111–118 is a two-position valve having a flow blocking position and a bidirectional flow position. Specifically, four of the two-position control valves 111, 112, 113 and 114 govern operation of the lift assembly cylinders 41, 42, 43 and 44, respectively, of the center frame 16. The first hydraulic line 107 is coupled by one pair of the two-position control valves 115 and 116 to the lift assembly cylinders 50 and 52 of one wing frame 18, and by another pair of the two-position control valves 117 and 118 to the lift cylinders 50 and 52 of the other wing frame 20. A separate solenoid 120 operates one of the electrohydraulic control valves 111–118 in response to a signal from an implement control unit (ICU) 122.

With continuing reference to FIG. 2, a separate position transducer 124, such as a potentiometer, is mechanically linked to each of the lift assemblies 21–24 and 31–34, and provides a feedback voltage indicating the position of the respective lift assembly. The transducer 124 responds to extension and retraction of the corresponding lift cylinder by varying the feedback voltage accordingly. Each transducer 124 is electrically connected to a separate input terminal of the ICU 122.

The ICU 122 contains a microcomputer which executes a control program stored in a memory. The microcomputer is connected to input and output circuits which respectively receive signals from the transducers 124 and provide control signals to the solenoids of the electrohydraulic control valves. If an electrically operated primary control valve 110 is employed, the ICU provides control signals which activate that valve. The ICU 122 also is interfaced to a control panel 126 by which the tractor operator is provided with indications of the implement's operation and can activate input devices to designate how the implement should be operated. The hardware of the ICU 122 and the control panel 126 is similar to controllers previously used on agricultural equipment.

In order to raise or lower the implement 10, the operator designates, via the control panel 126, whether the entire frame assembly 12 is to move the same relative positions wither respect to the ground or whether the various frames 16, 18 and 20 are to move to different positions. In this latter case, the operator makes entry into the control panel 126 designating the individual desired position for the center frame 16 and each wing frame 18 and 20. These designations are transmitted to the implement control unit 122. Then, the operator places the main control valve 110 into a position which will either raise or lower the implement.

For example, if the operator desires to lower the implement, the primary control valve 110 is moved into a position at which the supply line 105 carrying pressurized hydraulic fluid is connected to the second hydraulic line 108 and the first hydraulic line 107 is connected to the tank return line 106. This applies the pressurized hydraulic fluid to the rod side of each lift cylinder 40–43 and 50–53. At the same time, the implement control unit 122 sends signals to the solenoids 120 of the electrohydraulic control valves 111–118 which correspond to sections of the frame assembly 12 that the operator has designated be lowered. If a given section is not to be lowered, its respective electrohydraulic valves are activated into the open position.

The force of gravity acting on each of the lift assemblies 22–24 and 31–34 exerts a force on the respective lift cylinder 40–43 and 50–53 which increases the pressure within the base chamber of that cylinder. As a result, a single electrohydraulic valve 111–118 controlling the flow of hydraulic fluid into or out of the base side of the lift cylinders can control the operation of those cylinders. If the connection was reversed, whereby the base side of each lift cylinder was connected directly to the first hydraulic line 107 and the rod side was connected via the electrohydraulic control valve 111–118 to the second hydraulic line 108, the force produced by gravity acting on the implement could allow the implement to drop downward. This also would produce cavitation in the rod side of the cylinder. However, by controlling the flow of hydraulic fluid into and out of the base side of each cylinder, which receives the gravitational induced force, a single control valve is able to govern the operation of the lift function without a potential for cavitation.

Therefore, as the implement frame assembly 12 lowers, the pressurized hydraulic fluid in the second hydraulic line 108 is fed into the rod side of each lift cylinders 40–43 and 50–53. At this time, the fluid in the base side is exhausted through the now open electrohydraulic control valve 111–118 into the first hydraulic line 107 which is connected to the tank return line 106. While this is occurring, the implement control unit 122 monitors the input signals received from the position transducers 124. When a given transducer input signal indicates the respective lift assembly 21–24 or 31–34 has reached the desired position, as indicated by the operator entry into the control panel 126, the implement control unit 122 closes the respective electrohydraulic control valve 111–118 associated with that lift assembly. If other sections of the frame have not reached their desired position, their respective electrohydraulic valves 111–118 remain open to power their lift assemblies. Eventually, all of the frame sections reached the desired positions, at which time the ICU 122 has closed all the electrohydraulic control valves 111–118. The operator receives an indication of that event via the control panel 126 and can release the main control valve 110 which returns by spring force to the center off position.

A similar action occurs when the operator desires the raise the implement 10 in which case, the desired position of each frame 16, 18 and 20 is indicated by inputs to the control panel 126. The operator then activates the main control valve 110 so that pressurized fluid from the pump 102 is applied to the first hydraulic line 107 and the second hydraulic line 108 is connected to the tank return line 106. The implement control unit 122 then electrically activates the solenoid 120 of the electrohydraulic valves 111–118 associated with sections of the frame 12 that are to be raised. This action applies pressurized hydraulic fluid from the first hydraulic line 107 through the associated electrohydraulic control valve into the base side of the respective lift cylinder 40–43 or 50–53. This causes the piston within each cylinder to raise the respective section of the frame assembly 12. Because the rod side of each lift cylinder 40–43 and 50–53 is connected directly to the tank return line, the fluid is forced out of that side to the tank 104. As this action is occurring, the implement control unit 122 responds to the signals from the various position transducers 124 to determine when each frame 16, 18 and 20 has reached the desired position. At that time, the specific electrohydraulic control valves 111–118 associated with that frame section are closed to terminate further movement.

The hydraulic system 100 also automatically corrects for leakage at a cylinder which causes a portion of the frame to lower with respect to the other portions. Specifically, gravity acting on the implement exerts a force on the piston which pressurizes the hydraulic fluid in the base chambers of the lift cylinder 40–43 and 50–53. If a seal of a base chamber is weak, the hydraulic fluid may leak from the base chamber. When leakage occurs after the frames 16–20 have been positioned for earth working, the primary control valve 110 is closed and fluid is not being supplied to the cylinder from the pump 102. Therefore, the section of the frame connected to the leaking cylinder will drop downward during the earth working.

That dropping is sensed by the position transducer 124 coupled to the leaking cylinder which provides a signal to the ICU 122 indicating the change in the position of the frame. The ICU responds by activating the primary control valve 110 to the raise position and opening the electrohydraulic control valve 111–118 connected to the leaking cylinder. For example, if lift cylinder 40 has leaked fluid, control valve 111 is opened and the other electrohydraulic control valves 112–118 remain closed. This supplies hydraulic fluid to the leaking cylinder 40 and raising the dropped section of the frame 12. When that section has been raised to the desired position, as indicated by the associated position transducer 124, the ICU closes the primary control valve 110 and the corresponding electrohydraulic control valve 111.

The present invention is an improvement over prior hydraulic systems for individually lifting different sections of an implement. The instant hydraulic system requires only a single three-position, four-way main valve 110 and a separate two-position, bi-directional electrohydraulic valve for each cylinder. This reduces the complexity and cost of the control valves required to implement the lifting function of the implement 10. In addition there is a substantial reduction in plumbing required to distribute hydraulic fluid within the agricultural implement. As used herein the term "three-position" valve" refers to a valve that has three positions, and the term "two-position" valve" refers to a valve that has only two positions.

Figure 3:
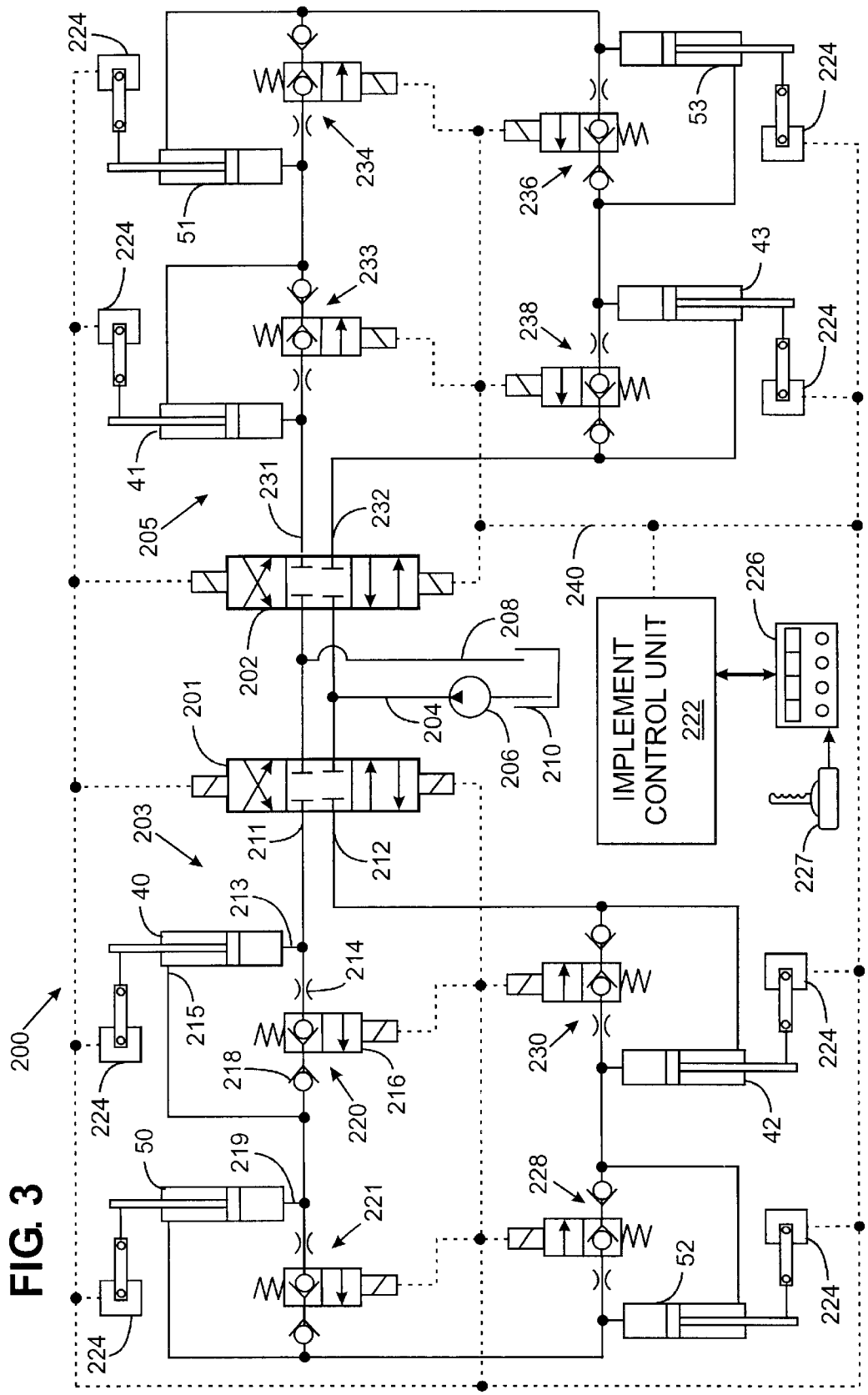
FIG. 3 is a schematic diagram of a second embodiment of the hydraulic system.

FIG. 3 illustrates another embodiment of a hydraulic system 200 according to the present invention for raising and lowering the implement 10. In this hydraulic system 200, the left and rights sides of the implement are controlled by independently operated first and second primary control valves 201 and 202, respectively, which are connected to separate lift valve circuits 203 and 205 for each side of the implement 10. The two primary control valves 101 and 102 selectively connect those valve circuits to a supply line 204 which receives pressurized fluid from pump 206 and to a tank return line 208 that conveys hydraulic fluid back to the tank 210. Preferably the first and second primary control valves 101 and 102 are electrohydraulic valves operated by a pairs of solenoids controlled by output signals from the implement control unit 22. However, manually operated primary control valves also may be used.

The first primary hydraulic valve 201 couples the supply and tank lines 204 and 208 to first and second hydraulic lines 211 and 212 connected to the first lift valve circuit 203. The lift valve circuit 203 connects lift cylinders 40, 50, 52 and 42 in a series in that order. Lift cylinder 40 is the first cylinder of that series and has first port 213 for a base chamber to which the first hydraulic line 211 is directly connected. A second port 215 for rod chamber of lift cylinder 40 is connected directly to the base chamber port 219 of lift cylinder 50 which is the next cylinder in the series. As will be described, fluid exhausted from either the rod chamber of lift cylinder 40 or the base chamber of lift cylinder 50 powers the other one of those chambers due to the series connection. As a consequence, the rod chamber of cylinder 40 and the base chamber of cylinder 50 must have equal cross-sectional areas, so that movement of one cylinder of this pair produces equal movement of the other cylinder. This size relationship between interconnected chambers of adjacent cylinders in the series continues through the entire series of cylinders 40, 50, 52 and 42 connected to the first lift valve circuit 203.

A first electrohydraulic valve assembly 220 is coupled between the two lift cylinders 40 and 50. This assembly 220 comprises an orifice 214, a two-position electrohydraulic valve 216, and a check valve 218 connected in series between the ports 213 and 215 of lift cylinder 40. Because the second port 215 for the rod chamber of lift cylinder 40 is connected directly to the first port 219 for the base chamber of lift cylinder 50, the first electrohydraulic valve assembly 220 also can be viewed as being connected between the first ports 213 and 219 of those two lift cylinders 40 and 50. The check valve 218 limits flow of fluid through this serial combination of elements to only a direction from cylinder 40 to cylinder 50 as occurs when the two-position valve 216 is open. As will be described, a separate electrohydraulic valve assembly identical to the first assembly 220 is associated with each lift cylinder in the hydraulic system 200.

A second hydraulic valve assembly 221 is connected between the base chambers of lift cylinder 50 and lift cylinder 52. The rod chamber of lift cylinder 50 is connected directly to the base chamber of lift cylinder 52. Continuing along serial connection provided by the first lift valve circuit 203, a third electrohydraulic lift valve assembly 228 is connected to allow fluid to flow from the base chamber of lift cylinder 52 to the base chamber of lift cylinder 42 when the electrohydraulic valve of that assembly is energized. A fourth electrohydraulic lift valve assembly 230 connects the base chamber of lift cylinder 42, which is the last cylinder in the series, to the second hydraulic line 212. The rod chamber of lift cylinder 52 is directly connected to the base chamber of lift cylinder 42, and the rod chamber of lift cylinder 52 is directly connected to the second hydraulic line 212.

As noted previously, a second primary control valve 202 is provided to control the raising and lowering of the right side of the implement 10. The second primary control valve 202 selectively couples the supply and tank return lines 204 and 208 to third and fourth hydraulic lines 231 and 232, respectively, for the second lift valve circuit 205. The second lift valve circuit 205 serially connects lift cylinders 41, 51, 53 and 43 in that order. Specifically, the third hydraulic line 231 is connected directly to the base chamber of lift cylinder 41 which has a rod chamber connected directly to the base chamber of lift cylinder 51. A fifth electrohydraulic valve assembly 233 enables fluid to flow from the base chamber of lift cylinder 41 to the base chamber of lift cylinder 51 when the two-position valve of that assembly is open. A sixth electrohydraulic valve assembly 234 couples the base chamber of the lift cylinder 51 to the base chamber of lift cylinder 53, which also is connected directly to the rod chamber of lift cylinder 51.

The rod chamber of lift cylinder 53 is connected directly to the base chamber of the last lift cylinder 43 in this series. A seventh electrohydraulic valve assembly 236 is connected to enable fluid to flow from the base chamber of lift cylinder 43 to the base chamber of lift cylinder 53 when the valve assembly is activated. An eighth electrohydraulic valve assembly 238 is connected to convey fluid from the base chamber of lift cylinder 53 into the fourth hydraulic line 232 upon activation of the respective electrohydraulic valve.

Each lift cylinder 40–43 and 50–53 is connected to a separate position transducer 224 which provides an electrical signal indicating the position of the respective cylinder to the implement control unit 222. Each of the transducers 224 and the various electrohydraulic valves 216, 221, 228, 230 and 233–238 are connected via a communication network 240 to the implement control unit 222. Instead of running individual electrical wire a between the respective components and the implement control unit, a conventional serial communication network 240 is utilized. Each of the position transducers has a standard network interface circuit which sends messages containing the respective position information over the network 240 to the implement control unit 222. Likewise, the implement control unit 222 can send activation commands via the serial communication network 240 to interface devices coupled to the solenoids for the respective electrohydraulic valves thereby causing those solenoids to activate the valve. The implement control unit 222 also is interfaced to an operator control panel 226 similar to that utilized in the embodiment of FIG. 2.

In order to raise or lower the implement 10 using the hydraulic system 200 in FIG. 3, the operator selects a desired position for each portion of the frame 12 via the control panel 226 and then activates a joy stick 227, or other type of input device, to designate whether the frame is to be raised or lowered. In response, the implement control unit 222 activates the solenoids for the first and second primary control valves 201 and 202 to selectively couple the supply line 204 and tank return line 208 to the first, second, third and fourth hydraulic lines 211, 212, 231 and 233. For example, if the frame 12 is to be raised, the first primary valve 202 is positioned to couple the supply line 204 to the first hydraulic line 211. This applies pressurized hydraulic fluid to the base chamber of the lift cylinder 40 causing that cylinder to raise the associated lift assembly 21.

As the fluid enters the base chamber of lift cylinder 40, fluid is evacuated from the rod chamber of that cylinder. The evacuating fluid flows into the base chamber of lift cylinder 50, producing a similar raising action at lift assembly 31 for the wing frame 18. As noted previously, the cross-sectional area of the base chamber of lift cylinder 50 equals that of the rod chamber of lift cylinder 50 so equal raising action will occur in both cylinders. If, for example, the first lift cylinder 40 reaches its desired position before lift cylinder 50, the implement control unit 222 recognizes this occurrence based on the signals from the respective position transducers 224. The implement control unit 222 responds by opening the valve 216 of the first electrohydraulic valve assembly 220 that is associated with lift cylinder 40. This valve activation provides a path for fluid to bypass the base chamber of lift cylinder 40, thereby terminating the lifting action of that cylinder while still applying hydraulic fluid to the next lift cylinder 50 in the series.

Similarly, should the position of lift cylinder 50 reach its desired position before that lift cylinder 40, the second electrohydraulic valve assembly 221 will be activated to provide a bypass path for the fluid being supplied to the base chamber of lift cylinder 50, while the first hydraulic valve assembly 220 remains closed. Thus, in this second case, the first lift cylinder 40 continues to move, while the movement of lift cylinder 50 has terminated due to the leakage path. Similar operation occurs at each of the other cylinders in the hydraulic circuit 200.

The hydraulic system 200 in FIG. 3 also can correct for leakage which occurs in a given lift cylinder 40–43 or 50–53. For example, if cylinder 41 leaks hydraulic fluid such that its associated lift assembly 22 begins to lower the frame, that movement will be detected by the associated position transducer 224, and a resultant signal provided to the implement control unit 222. The implement control unit 222 responds by activating the second primary control valve 202 to couple the supply line 204 to the third hydraulic line 231. At the same time, the implement control unit 222 activates the electrohydraulic valve assemblies 234–238 which are not associated with the cylinder 41 which is to be raised. In other words, electrohydraulic valve assemblies 234–238 are opened to provide bypass paths so that the respective lift cylinders 51, 43 and 53 do not move. However, the electrohydraulic valve assembly 233 associated with the cylinder 41 that is to be moved is maintained in a closed state. Thus, hydraulic fluid flows from the pump supply line 204 through the third hydraulic line 231 into the base chambers of each of the cylinders 41, 43, 51 and 53 on the right side of the implement. Electrohydraulic valve assemblies 234, 236 and 238 provide leakage bypass paths which drain fluid from those base chambers. However, a bypass path is not provided for hydraulic cylinder 41 which as a result begins raising the associated lift assembly 22. The fluid now is being exhausted from the rod chamber of the moving lift cylinder 41, bypasses the base chamber of the next lift cylinder 51 in the series without producing movement of that latter cylinder. This fluid flows into the fourth hydraulic line 232 and onward through the second primary valve 202 into the tank return line 208. As a consequence, in this arrangement of valves, only the designated lift cylinder 41 produces movement of the frame 12. When the frame reaches the desired position, the implement control unit 222 deactivates all the associated valves, shutting off the flow of hydraulic fluid and terminating movement of the frame 12.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. In an agricultural implement having a frame supported by a plurality of movable lift assemblies for raising and lowering the frame relative to the ground, a lift control system for controlling flow of pressurized hydraulic fluid from a supply line and flow of hydraulic fluid into a tank return line, said lift control system comprising:
   a first hydraulic line and a second hydraulic line;
   a primary control valve which selectively connects the first hydraulic line and the second hydraulic line to the supply line and the tank return line;
   a plurality of hydraulic cylinders, each mechanically coupled to the agricultural implement to produce movement of a different one of the plurality of vertically movable lift assemblies with respect to the frame, each of the plurality of hydraulic cylinders having a first port and a second port;
   the plurality of hydraulic cylinders hydraulically connected in a series between the first hydraulic line and the second hydraulic line, wherein a first hydraulic cylinder in the series has a first port connected directly to the first hydraulic line, each hydraulic cylinder, except for a last hydraulic cylinder in the series, has its second port connected to a next hydraulic cylinder in the series, and the last hydraulic cylinder in the series has its second port connected to the second hydraulic line; and
   a plurality of two-position lift controls valves, each connected between the first and second ports of one of the plurality of hydraulic cylinders.

2. The lift control system as recited in claim 1 wherein the primary control valve has a first position in which the first hydraulic line is connected to the supply line and the second hydraulic line is connected to the tank return line, a second position in which the first hydraulic line is connected to the tank return line and the second hydraulic line is connected to the supply line, and a third position in which the first hydraulic line and the second hydraulic line are isolated from the supply line and the tank return line.

3. The lift control system as recited in claim 1 wherein each of the plurality of lift control valves comprises an electrohydraulic valve.

4. The lift control system as recited in claim 1 further comprising a separate check valve connected in series with each of the plurality of lift control valves.

5. The lift control system as recited in claim 1 further comprising a separate flow control orifice connected in series with each of the plurality of lift control valves.

6. In an implement having a frame supported by a plurality of movable lift assemblies for raising and lowering the frame relative to the ground, a lift control system for controlling flow of pressurized hydraulic fluid from a supply line and flow of hydraulic fluid into a tank return line, said lift control system comprising:
   a first hydraulic line and a second hydraulic line;
   a primary control valve having a first position in which the first hydraulic line is connected to the supply line and the second hydraulic line is connected to the tank return line, a second position in which the first hydraulic line is connected to the tank return line and the second hydraulic line is connected to the supply line, and a third position in which the first hydraulic line and the second hydraulic line are isolated from the supply line and the tank return line;
   a plurality of hydraulic cylinders, each mechanically coupled to the agricultural implement to produce movement of a different one of the plurality of vertically movable lift assemblies with respect to the frame, each of the plurality of hydraulic cylinders having a first port and a second port, the plurality of hydraulic cylinders hydraulically connected in a series between the first hydraulic line and the second hydraulic line, wherein a first hydraulic cylinder in the series has a first port connected directly to the first hydraulic line, each hydraulic cylinder, except for a last hydraulic cylinder in the series, has its second port connected to a next hydraulic cylinder in the series, and the last hydraulic cylinder in the series has its second port connected to the second hydraulic line; and
   a plurality of two-position lift control valves, each connected between the first and second ports of one of the plurality of hydraulic cylinders.

7. The lift control system as recited in claim 6 wherein each of the plurality of electrohydraulic lift control valves has a first state in which hydraulic fluid is allowed to flow in either direction between the first and second ports, and a second state in which hydraulic fluid is allowed to flow in only one direction between the first and second ports.

8. The lift control system as recited in claim 6 further comprising a separate flow control orifice and a separate check valve connected in series with.

9. The lift control system as recited in claim 6 wherein each of the plurality of lift control valves comprises an electrohydraulic valve.

* * * * *